United States Patent
Kim et al.

(10) Patent No.: US 10,200,100 B2
(45) Date of Patent: Feb. 5, 2019

(54) METHOD FOR TRANSMITTING AND RECEIVING FEEDBACK INFORMATION IN WIRELESS COMMUNICATION SYSTEM AND DEVICE FOR SAME

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Heejin Kim, Seoul (KR); Dongkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 9 days.

(21) Appl. No.: 15/516,571

(22) PCT Filed: Jun. 26, 2015

(86) PCT No.: PCT/KR2015/006562
§ 371 (c)(1),
(2) Date: Apr. 3, 2017

(87) PCT Pub. No.: WO2016/076504
PCT Pub. Date: May 19, 2016

(65) Prior Publication Data
US 2018/0205437 A1 Jul. 19, 2018

Related U.S. Application Data

(60) Provisional application No. 62/079,546, filed on Nov. 13, 2014.

(51) Int. Cl.
*H04B 7/06* (2006.01)

(52) U.S. Cl.
CPC ............. *H04B 7/0621* (2013.01); *H04B 7/06* (2013.01); *H04B 7/0617* (2013.01); *H04B 7/0639* (2013.01)

(58) Field of Classification Search
CPC .. H04B 7/0617; H04B 7/0619; H04B 7/0621; H04B 7/0639
See application file for complete search history.

(56) References Cited

U.S. PATENT DOCUMENTS

| | | |
|---|---|---|
| 2012/0039298 A1 | 2/2012 | Lee et al. |
| 2013/0223380 A1 | 8/2013 | Kim et al. |

(Continued)

OTHER PUBLICATIONS

ETRI, "Potential CSI-RS and CSI Feedback Enhancements for EBF/FD-MIMO," 3GPP TSG RAN WG1 Meeting #79, San Francisco, USA, Nov. 17-21, 2014 (downloaded Nov. 8, 2014), R1-144923, pp. 1-6.

*Primary Examiner* — David B. Lugo
(74) *Attorney, Agent, or Firm* — Birch, Stewart, Kolasch & Birch, LLP

(57) ABSTRACT

A method by which a base station receives feedback information on beamforming in a wireless communication system, according to one embodiment of the present invention, comprises the steps of: transmitting an omni-directional beam formed uniformly in all directions, on the basis of a non-precoded first signal; transmitting a plurality of directional beams through a plurality of antenna ports on the basis of second signals precoded in different directions; and receiving feedback information from a terminal, wherein the feedback information includes a gain difference between a first directional beam among the plurality of directional beams and the omni-directional beam, and an index of a first antenna port used in transmitting the first directional beam among the plurality of antenna ports.

10 Claims, 13 Drawing Sheets

(56) References Cited

U.S. PATENT DOCUMENTS

| | | |
|---|---|---|
| 2014/0146863 A1 | 5/2014 | Seol et al. |
| 2014/0169208 A1 | 6/2014 | Li et al. |
| 2014/0369435 A1* | 12/2014 | Kneckt ............... H04B 7/0413 375/267 |
| 2015/0358132 A1* | 12/2015 | Wallen ................ H04L 5/0023 370/329 |
| 2016/0337056 A1* | 11/2016 | Frenne ................ H04B 7/0695 |

* cited by examiner

METHOD FOR TRANSMITTING AND RECEIVING FEEDBACK INFORMATION IN WIRELESS COMMUNICATION SYSTEM AND DEVICE FOR SAME

CROSS REFERENCE TO RELATED APPLICATIONS

This application is the National Phase of PCT International Application No. PCT/KR2015/006562, filed on Jun. 26, 2015, which claims priority under 35 U.S.C. 119(e) to U.S. Provisional Application No. 62/079,546, filed on Nov. 13, 2014, all of which are hereby expressly incorporated by reference into the present application.

TECHNICAL FIELD

The present invention relates to a method of transmitting and receiving feedback information for performing beamforming in a wireless communication system and an apparatus therefor.

BACKGROUND ART

MIMO (multiple-input multiple-output) used in a wireless communication system is a scheme of increasing channel capacity and enhancing transceiving efficiency using multiple transmitting antennas and/or multiple receiving antennas. MIMO may be called a multi-antenna.

In MIMO environment, it may be unnecessary for data to be transmitted on a single antenna path. For instance, in MIMO environment, a receiver can reconfigure data by aggregating data fragments respectively received through a plurality of receiving antennas. Comparing a single antenna environment and an MIMO environment to each other, a data rate can be improved by maintaining a cell area size or coverage can be increased by maintaining a data rate, in MIMO environment.

A beamforming scheme in MIMO environment is widely used for a base station, a user equipment, a relay or the like. The beamforming scheme can be classified into a digital beamforming scheme or an analog beamforming scheme depending on whether a weight vector/matrix (or a precoding vector/matrix) is used for a baseband or an RF band. And, the digital beamforming scheme is applied to a precoding procedure of 3G/4G mobile communication system. For instance, in a current mobile communication system, a user equipment feds back a precoding matrix index (PMI) to a base station for a closed-loop based digital beamforming and the base station performs a beamforming based on the PMI.

DISCLOSURE OF THE INVENTION

Technical Task

A technical task of the present invention is to provide a method of accurately and efficiently determining, transmitting and receiving feedback information for beamforming in a wireless communication system.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving feedback information on beamforming by a base station in a wireless communication system, includes transmitting an omni-directional beam, which is uniformly formed in all directions, based on a non-precoded first signal, transmitting a plurality of directional beams through a plurality of antenna ports based on second signals which are precoded in a different direction, and receiving feedback information from a user equipment. In this case, the feedback information includes a gain difference between a first directional beam among the plurality of directional beams and the omni-directional beam and an index of a first antenna port used for transmitting the first directional beam among the plurality of antenna ports.

To further achieve these and other advantages and in accordance with the purpose of the present invention, according to a different embodiment, a base station receiving feedback information on beamforming in a wireless communication system includes a transmitter configured to transmit an omni-directional beam, which is uniformly formed in all directions, based on a non-precoded first signal and configured to transmit a plurality of directional beams through a plurality of antenna ports based on second signals which are precoded in a different direction, a receiver configured to receive feedback information from a user equipment, and a processor configured to control the transmitter and the receiver. In this case, the feedback information includes a gain difference between a first directional beam among the plurality of directional beams and the omni-directional beam and an index of a first antenna port used for transmitting the first directional beam among the plurality of antenna ports.

To further achieve these and other advantages and in accordance with the purpose of the present invention, according to a further different embodiment, a method of transmitting feedback information on beamforming by a UE in a wireless communication system, includes measuring an omni-directional beam, which is uniformly formed in all directions, based on a non-precoded first signal, measuring a first directional beam among a plurality of directional beams based on second signals which are precoded in a different direction, and transmitting feedback information to a base station. In this case, the feedback information includes a gain difference between a first directional beam among the plurality of directional beams and the omni-directional beam and an index of a first antenna port used for transmitting the first directional beam among the plurality of antenna ports of the base station.

To further achieve these and other advantages and in accordance with the purpose of the present invention, according to a further different embodiment, a user equipment transmitting feedback information on beamforming in a wireless communication system includes a processor configured to measure an omni-directional beam, which is uniformly formed in all directions, based on a non-precoded first signal and configured to measure a first directional beam among a plurality of directional beams based on second signals which are precoded in a different direction, and a transmitter configured to transmit feedback information to a base station according to the control of the processor. In this case, the feedback information includes a gain difference between a first directional beam among the plurality of directional beams and the omni-directional beam and an index of a first antenna port used for transmitting the first directional beam among the plurality of antenna ports of the base station.

Preferably, each of the plurality of antenna ports can transmit each of the plurality of directional beams in a different direction.

Preferably, the plurality of directional beams can be formed by precoding at least one of a Demodulation Reference Signal (DMRS), a Channel State Information-Reference Signal (CSI-RS), and an enhanced PDCCH (EPDCCH) in a different direction.

Preferably, the omni-directional beam can be formed based on at least one of a Cell-specific Reference Signal (CRS), a Primary Synchronization Signal (PSS), an Secondary Synchronization Signal (SSS), a Positioning Reference Signal (PRS), a Physical Broadcasting Channel (PBCH), a Physical Multicast Channel (PMCH), a Physical Control Format Indication Channel (PCFICH), and a Physical Downlink Control Channel (PDCCH).

Preferably, the base station can obtain PMI based on the index of the first antenna port and the gain difference. More preferably, the base station identifies a direction of the first directional beam based on the index of the first antenna port and selects PMI, which is mapped to the identified direction of the first directional beam and the gain difference, from a codebook.

Advantageous Effects

According to embodiments of the present invention, it is able to accurately and efficiently transmit and receive feedback information necessary for performing beamforming.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

Reference will now be made in detail to the preferred embodiments of the present invention, examples of which are illustrated in the accompanying drawings. Configurations, functions and other features of the present invention can be easily understood through the embodiments of the present invention.

In the present specification, a name of a base station can be used as an inclusive terminology for RRH (remote control head), eNB, TP (transmission point), RP (repetition point), RN (relay) or the like. Moreover, in case of applying carrier aggregation, an operation of a base station described by the invention may be applicable to a component carrier (CC) or a cell. A beamforming covers the precoding concept and a weight vector/matrix for a beamforming covers the concept of a precoding vector/matrix.

MIMO Environment

Figure 1:
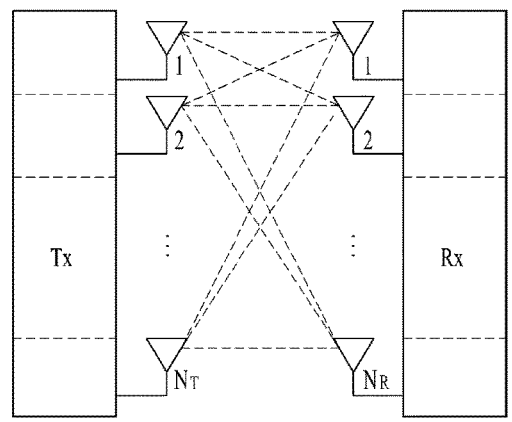
FIG. 1 is a diagram for a general MIMO environment.

A general MIMO (multi-input multi-output) environment is described with reference to FIG. 1 as follows.

$N_T$ transmitting antennas are installed on a transmitting stage, while $N_R$ receiving antennas are installed on a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_i$, as shown in Formula 1. In this case, $R_i$ is a smaller one of $N_T$ and $N_R$.

$$R_i = \min(N_T, N_R) \quad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 1, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Formula 2.

$$s = [s_1, s_2, \ldots, s_{N_T}]^T \qquad \text{[Formula 2]}$$

Meanwhile, transmission powers can be set different from each other for transmission informations $s_1, s_2, \ldots, s_{N_T}$, respectively. If the transmission powers are set to $P_1, P_2, \ldots, P_{N_T}$, respectively, the transmission power adjusted transmission information can be represented as Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Formula 3]}$$

And, $\hat{S}$ may be represented as Formula 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

Let us consider a case of configuring $N_T$ transmitted signals $x_1, x_2, \ldots, x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1, x_2, \ldots, x_{N_T}$ may be represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \qquad \text{[Formula 5]}$$

$$= W\hat{s}$$

$$= WPs$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by formula, a rank of a channel H (i.e., rank (H)) is limited by Formula 6.

$$\text{rank}(H) \leq \min(N_T, N_R) \qquad \text{[Formula 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Formula 7.

$$\text{\# of streams} \leq \text{rank}(H) \leq \min(N_T, N_R) \qquad \text{[Formula 7]}$$

In this case, '# of streams' may indicate the number of streams. Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

The maximum number of transceiving antennas is assumed as 8 in a general MIMO environment. Yet, as the MIMO environment is evolved into a massive MIMO, the number of antennas can increase over tens or hundreds.

Figure 2:
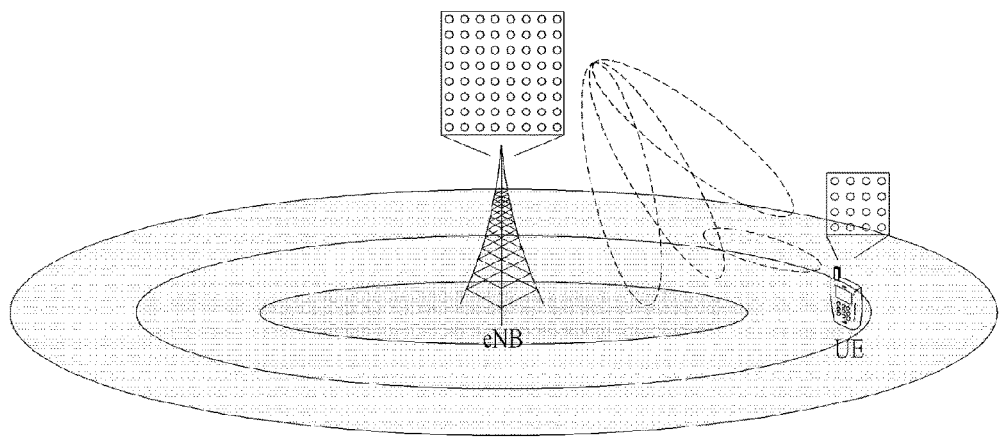
FIG. 2 is a diagram for a massive MIMO environment.

FIG. 2 shows one embodiment of a massive MIMO environment. Particularly, FIG. 2 diagrammatizes a system in which a base station or user equipment has a plurality of transmitting/receiving antennas capable of an active antenna system based 3D beamforming.

Referring to FIG. 2, if a 3D (3-dimensional) beam pattern is utilized in a transmitting antenna aspect, it is able to perform a quasi-static or dynamic beamforming in a vertical direction of a beam as well as in a horizontal direction of the beam. And, it is also able to consider application such as a sector forming in a vertical direction or the like. Moreover, in a receiving antenna aspect, when a receiving beam is formed using massive receiving antennas, it is able to expect a signal power increasing effect in accordance with an antenna array gain. Hence, in case of uplink, a base station can receive a signal transmitted from a user equipment through a plurality of antennas. In doing so, it is advantageous in that the user equipment can set its transmission power to a very low power in consideration of a gain of the massive receiving antennas in order to reduce interference influence.

Analog Beamforming & Digital Beamforming

Figure 3:
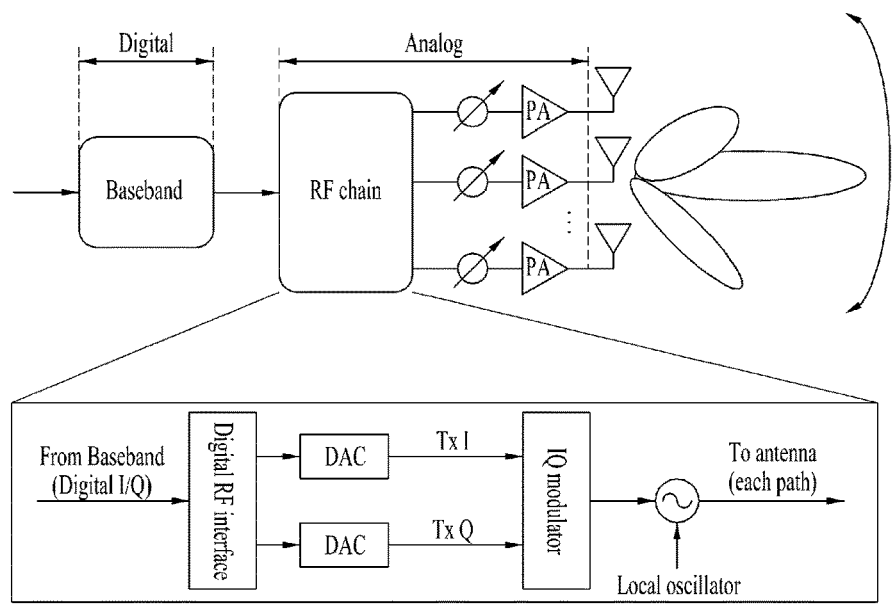
FIG. 3 is a diagram for one example of an analog beamforming scheme.

FIG. 3 is a diagram for one example of an analog beamforming scheme. An analog beamforming scheme is a representative beamforming scheme applied to an initial multi-antenna structure. A beamforming is performed in a manner as follows. First of all, after a digital signal processing has been completed, an analog signal is made to diverge into a plurality of paths. Secondly, phase shift (PS) and power amplification (power amplifier: PA) are set up on each of the diverging paths.

Referring to FIG. 3, an analog beamforming is performed in a manner that a power amplifier and a phase shifter connected to an antenna process an analog signal outputted from a single digital signal. In an analog stage, the phase shifter and the power amplifier applies a complex weight to the analog signal. In FIG. 1, an RF (radio frequency) chain means a processing block for converting a signal digital signal to an analog signal.

Yet, according to an analog beamforming scheme, accuracy of a beam is determined depending on characteristics of devices of the phase shifter and the power amplifier. Hence, in aspect of controlling the devices of the phase shifter and the power amplifier, the analog beamforming scheme is appropriate for a narrowband transmission. According to the analog beamforming scheme, since complexity of a hardware structure increases considerably in case of implementing a multi-stream transmission, it is difficult to improve a transmission rate through a multiplexing gain and it is also difficult to perform a beamforming per user based on orthogonal resource allocation.

Figure 4:
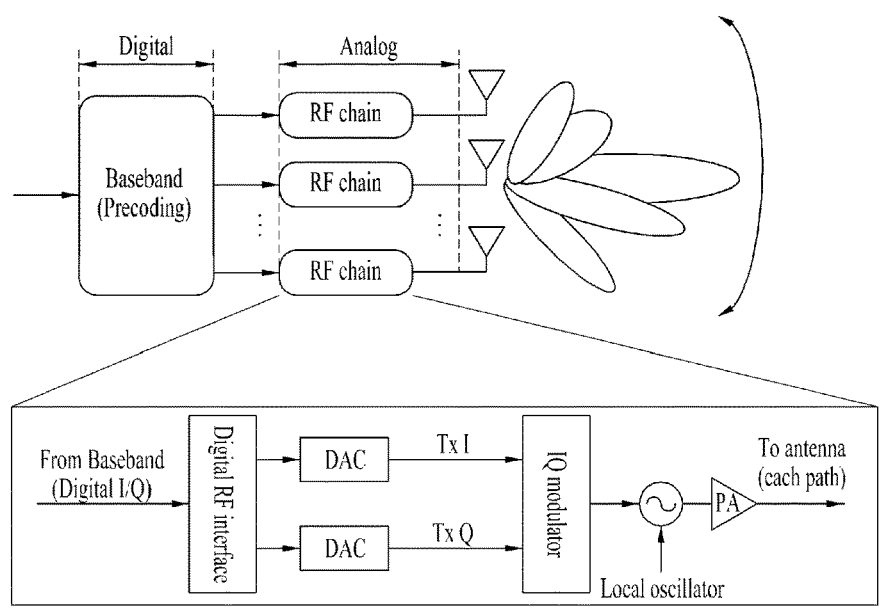
FIG. 4 is a diagram for one example of a digital beamforming scheme.

FIG. 4 is a diagram for one example of a digital beamforming scheme. According to the digital beamforming scheme, a beamforming is performed in a digital stage using a baseband process. Hence, unlike the analog beamforming scheme, the digital beamforming scheme is appropriate for maximizing diversity and multiplexing gain in an MIMO environment.

Referring to FIG. 4, application of a weight matrix (or a precoding matrix), e.g., a precoding is performed in a baseband process. In case of a digital beamforming, unlike the case of the analog beamforming shown in FIG. 1, an RF chain includes a power amplifier. The reason for this is that a complex weight for a beamforming is directly applied to a transmitted data.

Moreover, according to a digital beamforming scheme, it is able to form a beam different for each user. For instance, beams for multiple users can be simultaneously formed. Since it is possible to implement a digital beamforming independent for each user to which an orthogonal resource is allocated, a scheduling is relatively free and an operation of a transmitting stage in accordance with a system purpose is facilitated. Moreover, if MIMO-OFDM (orthogonal frequency division multiplexing) and technology are applied in a broadband transmission environment, it is able to form a beam independent per subcarrier. Thus, according to the digital beamforming scheme, since system capacity and beam gain are improved, a transmission rate for each user can be maximized.

In order to apply a digital beamforming technology in a massive MIMO environment, since a baseband processor should perform a precoding process for hundreds of antennas, digital signal processing complexity increases considerably. Moreover, since RF chains are required as many as the number of antennas, hardware implementation complexity increases considerably. Particularly, in case of FDD (frequency division duplex) system, since feedback information on massive MIMO channels for the entire antennas is required, it is disadvantageous in that a reference signal (or pilot signal) transmission and feedback overhead for the corresponding transmission are increased considerably.

If an analog beamforming technology is applied in a massive MIMO environment, hardware complexity of a transmitting stage is relatively low, an performance increase extent using multiple antennas is insignificant, and flexibility of resource allocation is lowered. Particular, in case of a broadband transmission, it is very difficult to control a beam per frequency.

Table 1 shows performance gain and complexity relations between an analog beamforming scheme and a digital beamforming scheme.

TABLE 1

|  | Beamforming accuracy control facilitation | Multicarrier beam control | Multi-stream transmission | Hardware complexity (BB process) | Pilot and feedback overhead |
| --- | --- | --- | --- | --- | --- |
| Analog beamforming scheme | Low (PA/PS device characteristics and relation) | Impossible or difficult | Impossible or difficult | Low | Low |
| Digital beamforming scheme | High | Possible | Possible | High | High |

Modeling of Hybrid Beamforming

In a massive MIMO environment according to one embodiment of the present invention, instead of selectively applying one of an analog beamforming scheme and a digital beamforming scheme, it is able to apply a hybrid beamforming resulting from combining an analog beamforming structure and a digital beamforming structure together. Therefore, in order to lower hardware implementation complexity of a transmitting stage and to obtain a maximum beamforming gain using a massive MIMO, it is necessary to design a transmitting stage structure of a hybrid type.

Figure 5:
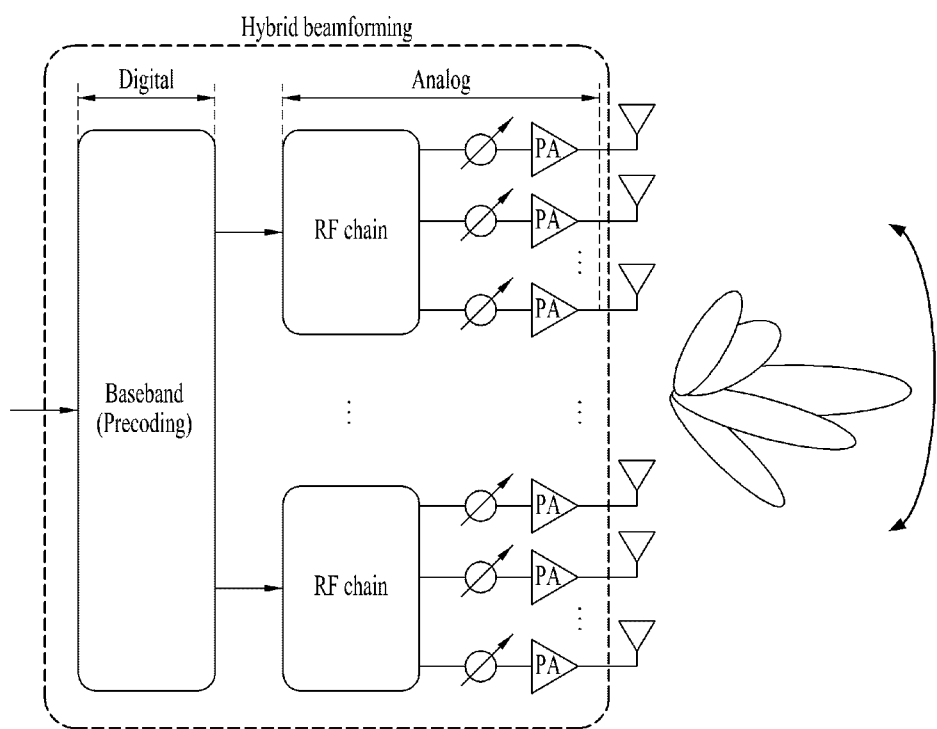
FIG. 5 is a diagram for explaining the concept of a hybrid beamforming according to one embodiment of the present invention.

FIG. 5 is a diagram to describe the concept of a hybrid beamforming according to one embodiment of the present invention. According to a hybrid beamforming, a digital signal of a baseband having a digital beamforming scheme applied thereto is primarily converted to an analog signal of an RF band and an analog beamforming scheme is secondarily applied to the analog signal. Hence, for a hybrid beamforming scheme, a transmitting stage should be able to support both of the digital beamforming scheme and the analog beamforming scheme.

Items or matters taken into consideration for a hybrid beamforming are described as follows.

It is difficult to simultaneously optimize an analog beamforming and a digital beamforming. Basically, a digital beamforming is able to apply a beamforming scheme independent per user with the same time-frequency resource. On the other hand, an analog beamforming has a limitation such that a beamforming scheme common to users should be applied with the same time-frequency resource. The limitation of the analog beamforming causes difficulty in optimizing the supportable rank number, beam control flexibility and beamforming resolution in a hybrid beamforming.

An analog beamforming scheme for forming a beam in a specific direction only in the same time-frequency resource has difficulty in forming a plurality of beams in all user equipment direction at the same time. Hence, the analog beamforming scheme causes a problem that UL/DL control channel, reference signal, synchronization signal and the like are not transmitted simultaneously to all user equipments distributed in all areas in a cell.

In case of performing channel estimation on an analog/digital beam, a digital beamforming scheme can use an existing orthogonal pilot assignment as it is. Yet, in an analog beamforming scheme, a time-duration amounting to the number of beam candidates is required. A time delay taken for a channel estimation of an analog beam is relatively long. In case of estimating a digital beam and an analog beam simultaneously, complexity increases considerably.

According to a digital beamforming scheme, a beamforming for multiple users/streams is free. Yet, according to an analog beamforming scheme, since a beamforming by the same weight vector/matrix is performed on a full transmission band, it is difficult to perform a beamforming independent per user or stream. Particularly, since FDMA (e.g., OFDMA) support through orthogonal frequency resource allocation is difficult, it is difficult to optimize a frequency resource.

In the following description, feedback methods for a hybrid beamforming are explained in consideration of the features or properties mentioned in the foregoing description. First of all, in an existing mobile communication system that uses one of an analog beamforming scheme and a digital beamforming scheme, performing a closed loop based beamforming (or precoding) is facilitated. For instance, a user equipment receives a reference signal transmitted by a base station and then determines a precoding matrix index (PMI), a rank indicator (RI), and a channel quality indicator (CQI). The user equipment feeds back a channel state information (CSI) containing the PMI, CQI and/or RI to the base station. Subsequently, the base station performs a beamforming using the PMI transmitted by the user equipment. Alternatively, the base station may perform a beamforming using a different PMI without being restricted by the PMI transmitted by the user equipment.

Thus, in case that the existing method is intactly applied to a hybrid beamforming, a user equipment should measure and report a PMI for an analog beamforming and a PMI for a digital beamforming, respectively. Hence, overhead for the measurement and reporting increases twice. Moreover, if the PMI for the analog beamforming and the beamforming for the digital beamforming are different from each other, it causes another problem. For instance, assuming that an optimal PMI for an analog beamforming and an optimal PMI for a digital beamforming indicate a zero-degree direction and a 30-degree direction, respectively, since a direction of an analog beam and a direction of a digital beam are different from each other, a gain of a hybrid beamforming may be represented as low considerably.

According to one embodiment of the present invention, it is able to determine a PMI for a digital beamforming based on a measurement of an analog beam. For instance, a user equipment feeds back only a measurement result of an analog beam to a base station and may not feed back a PMI for a digital beamforming. For another instance, a user equipment may determine a PMI for a digital beamforming using a measurement result of an analog beam. A measurement result of the analog beam and the PMI for the digital beamforming may be fed back to a base station.

Figure 6:
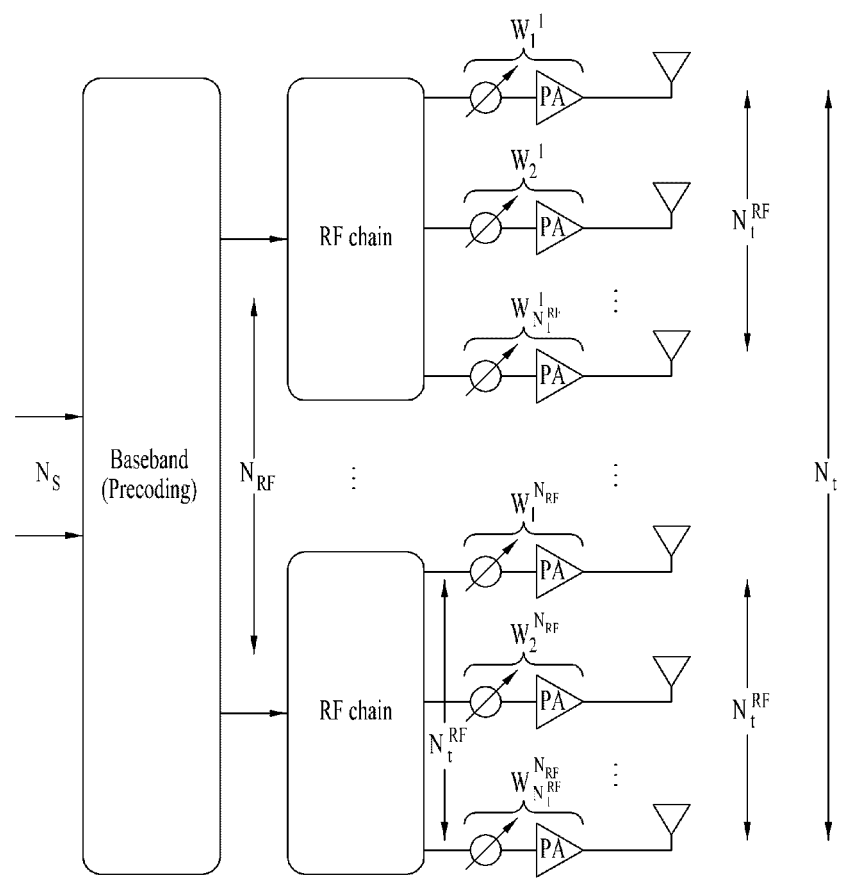
FIG. 6 is a diagram for a structure of a transmitting end performing a hybrid beamforming according to one embodiment of the present invention.

FIG. 6 is a diagram of a structure of a transmitting stage for performing a hybrid beamforming according to one embodiment of the present invention. According to the present embodiment, each RF chain is assumed as including $N_t^{RF}$ independent antennas, by which the present embodiment is non-limited. For instance, the number of antennas provided to each RF chain may be configured differently.

According to the present embodiment, a relation of $N_t = N_t^{RF} \times N_{RF}$ exists among the total antenna number $N_t$, the RF chain number N and the per-RF chain antenna number $N_t^{RF}$. Since a signal having passed through a phase shifter and a power amplifier per RF chain is sent to a transmitting antenna, a system model can be defined as Formula 8.

$$y_k = H_k F^{RF} F_k^{BB} s_k + z_k \qquad \text{[Formula 8]}$$

In Formula 8, the k indicates a subcarrier index. The subcarrier index k has a value ranging 0 to ($N_{FFT}-1$). The $N_{FFT}$ indicates a maximum FFT (Fast Fourier Transform) size supported by a system. And, the total subcarrier number may be limited to a range within the FFT size.

The $y_k$ means a received signal vector having a size '$N_r \times 1$' in the subcarrier k. The $H_k$ means a channel matrix having a size of '$N_r \times N_t$' in the subcarrier k. The $F^{RF}$ means an RF precoder (i.e., a weight matrix for an analog beamforming) having a size of '$N_t \times N_t$' in a whole subcarrier. And, the RF precoder (analog beamforming) may be identically applicable to the whole subcarrier. The $F_k^{BB}$ means a baseband precoder (i.e., a weight matrix for a digital beamforming) having a size of '$N_{RF} \times N_S$' in the subcarrier k. And, the baseband precoder (digital beamforming) may be individually configured per subcarrier. The $s_k$ indicates a transmitted signal vector having a size of '$N_S \times 1$' in the subcarrier k and the $z_k$ indicates a noise signal vector having a size of '$N_r \times 1$' in the subcarrier k.

The $N_{RF}$ indicates the total number of RF chains, the $N_t$ means the total number of the transmitting stage antennas, and the $N_t^{RF}$ means the number transmitting antennas provided per RF chain. The $N_r$ indicates the total number of the receiving stage antennas and the $N_S$ indicates the number of transmitted data streams.

Each term in Formula 8 is represented in detail as Formula 9.

$$\begin{bmatrix} y^{(1)} \\ \vdots \\ y^{(Nr)} \end{bmatrix} = \begin{bmatrix} h_{11} & h_{12} & \cdots & h_{1Nt} \\ h_{21} & h_{22} & \cdots & h_{2Nt} \\ \vdots & \vdots & \ddots & \vdots \\ h_{Nr1} & h_{Nr2} & \cdots & h_{NrNt} \end{bmatrix} \qquad \text{[Formula 9]}$$

$$F^{RF} \left( \begin{bmatrix} v_{1,1} & v_{1,2} & \cdots & v_{1,N_{RF},N_S} \\ v_{2,1} & v_{2,2} & \cdots & v_{N_{RF},N_S} \\ \vdots & \vdots & \ddots & \vdots \\ v_{N_{RF},1} & v_{N_{RF},2} & \cdots & v_{N_{RF},N_S} \end{bmatrix} \begin{bmatrix} x^{(1)} \\ \vdots \\ x^{(N_S-1)} \end{bmatrix} \right) + \begin{bmatrix} z^{(1)} \\ \vdots \\ z^{(Nr)} \end{bmatrix}$$

The '$N_t \times N_{RF}$' precoding matrix $F^{RF}$ of an analog beamforming performed after an RF chain by a phase shifter and a power amplifier can be expressed as Formula 10 in the following.

$$F^{RF} = \begin{bmatrix} w_{N_t^{RF}}^1 & 0 & 0 & \cdots & 0 \\ 0 & w_{N_t^{RF}}^2 & 0 & \cdots & 0 \\ 0 & 0 & w_{N_t^{RF}}^3 & \cdots & 0 \\ \vdots & \vdots & \vdots & \ddots & \vdots \\ 0 & 0 & 0 & \cdots & w_{N_t^{RF}}^{N_{RF}} \end{bmatrix} \qquad \text{[Formula 10]}$$

Moreover, a vector indicating a weight for each oft antennas belonging to an RF chain I in the precoding matrix $F^{RF}$ can be defined as Formula 11 in the following.

$$w^j_{N_t^{RF}} = \begin{bmatrix} w^j_1 \\ w^j_2 \\ \vdots \\ w^j_{N_t^{RF}} \end{bmatrix}$$ [Formula 11]

Beam Radiation Pattern of Hybrid Beamforming

A hybrid beamforming scheme of the present invention can be performed based on one of antennas of various types including a 1D array, a 2D array, a ring type array and the like. For clarity of the following description, a beam radiation pattern of a hybrid beamforming is described based on ULA (Uniform linear array) antenna. The ULA antenna is exemplarily illustrated, by which the scope of the appended claims and their equivalents is non-limited. In the ULA antenna, a plurality of antenna elements are linearly arrayed in a manner of being spaced apart from each other by an equal space d.

An array response vector of the ULA antenna is expressed as Formula 12 in the following.

$$a(\theta) = \begin{bmatrix} 1 & \exp\left(j2\pi \times 1 \times \frac{d}{\lambda}\sin(\theta)\right) \\ \exp\left(j2\pi \times 2 \times \frac{d}{\lambda}\sin(\theta)\right) & \dots & \exp\left(j2\pi \times (N_t-1) \times \frac{d}{\lambda}\sin(\theta)\right) \end{bmatrix}^T$$ [Formula 12]

In Formula 12, the $\lambda$ indicates a wavelength and the d indicates an inter-antenna distance. For clarity, in order to represent an antenna radiation pattern of a hybrid beamformer, the RF chain number $N_{RF}$ is assumed as 4 and the per-RF chain analog antenna number $N_t^{RF}$ is assumed as 4.

Figure 7:
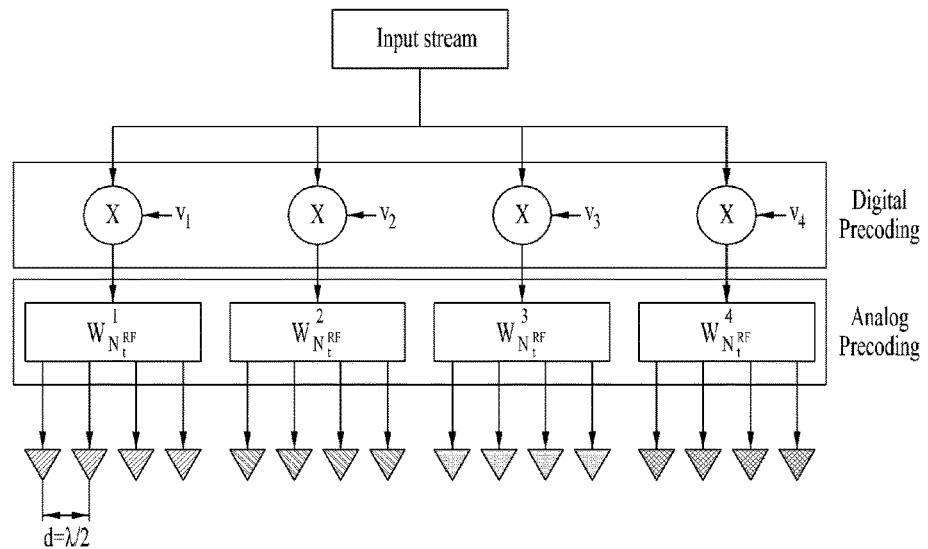
FIG. 7 is a diagram for 16-ULA antenna structure consisting of 4 RF chains according to one embodiment of the present invention.

FIG. 7 is a diagram of 16-ULA antenna structure configured with 4 RF chains according to one embodiment of the present invention. Particularly, in FIG. 7, the total transmitting antenna number $N_t$ is 16 and it is $d=\lambda/2$. According to the example shown in FIG. 7, a precoding matrix for an analog beamforming is defined as Formula 13.

$$F^{RF} = \begin{bmatrix} w^1_{N_t^{RF}} & 0 & 0 & 0 \\ 0 & w^2_{N_t^{RF}} & 0 & 0 \\ 0 & 0 & w^3_{N_t^{RF}} & 0 \\ 0 & 0 & 0 & w^4_{N_t^{RF}} \end{bmatrix},$$ [Formula 13]

$$w^j_{N_t^{RF}} = \begin{bmatrix} w^j_1 \\ w^j_2 \\ w^j_3 \\ w^j_4 \end{bmatrix}$$

In order to form a beam toward a boresight, i.e., a direction of a center of a main lobe of a radio wave radiating from an antenna, a steering angle of the beam is set to 0°. Hence, a value of each of elements of weight vectors of an analog precoding matrix becomes 1. In this case, a random weight vector of a rank 1, which is to be applied to a digital beamforming stage, is defined as Formula 14 in the following. For clarity, a rank 1 is assumed, by which the present invention is non-limited.

$$F^{BB} = v_1 = [v_1 v_2 v_3 v_4]^T$$ [Formula 14]

A whole antenna array response vector to which the digital beamforming of Formula 14 is applied at a boresight can be represented as Formula 15. In this case, In this case, an inter-antenna distance d is assumed as $\lambda/2$. An antenna array response can be represented as a sum of all vector elements.

$$\Sigma a(\theta) = \sum_{i=0}^{15} a_i(\theta) = (1 \cdot w_1^1 + \exp(j\pi \times \sin(\theta)) \cdot w_1^2 +$$
$$\exp(j\pi 2 \times \sin(\theta)) \cdot w_1^3 + \exp(j\pi 3 \times \sin(\theta)) \cdot w_1^4) \times v_1 +$$
$$(\exp(j\pi 4 \times \sin(\theta)) \cdot w_2^1 + \exp(j\pi 5 \times \sin(\theta)) \cdot w_2^2 +$$
$$\exp(j\pi 6 \times \sin(\theta)) \cdot w_2^3 + \exp(j\pi 7 \times \sin(\theta)) \cdot w_2^4) \times v_2 +$$
$$(\exp(j\pi 8 \times \sin(\theta)) \cdot w_3^1 + \exp(j\pi 9 \times \sin(\theta)) \cdot w_3^2 +$$
$$\exp(j\pi 10 \times \sin(\theta)) \cdot w_3^3 + \exp(j\pi 1 \times \sin(\theta)) \cdot w_3^4) \times v_3 +$$
$$(\exp(j\pi 12 \times \sin(\theta)) \cdot w_4^1 + \exp(j\pi 13 \times \sin(\theta)) \cdot w_4^2 +$$
$$\exp(j\pi 14 \times \sin(\theta)) \cdot w_4^3 + \exp(j\pi 15 \times \sin(\theta)) \cdot w_4^4) \times v_4$$
[Formula 15]

In this case, an analog beamforming weight can be set as Formula 16.

$$w_1^1 = \begin{bmatrix} 1 \\ e^{-j\pi\sin(\phi)} \\ e^{-j\pi 2\sin(\phi)} \\ e^{-j\pi 3\sin(\phi)} \end{bmatrix},$$ [Formula 16]

$$w_2^1 = \begin{bmatrix} e^{-j\pi 4\sin(\phi)} \\ e^{-j\pi 5\sin(\phi)} \\ e^{-j\pi 6\sin(\phi)} \\ e^{-j\pi 7\sin(\phi)} \end{bmatrix} = e^{j\pi 4\sin(\theta)} \begin{bmatrix} 1 \\ e^{-j\pi\sin(\phi)} \\ e^{-j\pi 2\sin(\phi)} \\ e^{-j\pi 3\sin(\phi)} \end{bmatrix},$$

$$w_3^1 = \begin{bmatrix} e^{-j\pi 8\sin(\phi)} \\ e^{-j\pi 9\sin(\phi)} \\ e^{-j\pi 10\sin(\phi)} \\ e^{-j\pi 11\sin(\phi)} \end{bmatrix} = e^{j\pi 8\sin(\theta)} \begin{bmatrix} 1 \\ e^{-j\pi\sin(\phi)} \\ e^{-j\pi 2\sin(\phi)} \\ e^{-j\pi 3\sin(\phi)} \end{bmatrix},$$

$$w_4^1 = \begin{bmatrix} e^{-j\pi 12\sin(\phi)} \\ e^{-j\pi 13\sin(\phi)} \\ e^{-j\pi 14\sin(\phi)} \\ e^{-j\pi 15\sin(\phi)} \end{bmatrix} = e^{j\pi 12\sin(\theta)} \begin{bmatrix} 1 \\ e^{-j\pi\sin(\phi)} \\ e^{-j\pi 2\sin(\phi)} \\ e^{-j\pi 3\sin(\phi)} \end{bmatrix},$$

If Formula 15 is simply summarized using Formula 16, Formula 17 can be acquired.

$$\Sigma a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times (v_1 + \exp(j\pi 4[\sin(\theta) - \sin(\phi)]) \cdot v_2 + \exp(j\pi 8[\sin(\theta) - \sin(\phi)]) \cdot v_3 + \exp(j\pi 12[\sin(\theta) - \sin(\phi)]) \cdot v_4)$$ [Formula 16]

If Formula 16 is generalized, it can be represented as Formula 17.

$$\Sigma a(\theta) = (1 + \exp(j\pi[\sin(\theta) - \sin(\phi)]) +$$
$$\ldots + \exp(j\pi(N_t^{RF} - 1) \cdot [\sin(\theta) - \sin(\phi)])) \times$$
$$(v_1 + \exp(j\pi \cdot (N_t^{RF}) \cdot [\sin(\theta) - \sin(\phi)]) \cdot v_2 + \ldots +$$
$$\exp(j\pi \cdot [N_t^{RF} \cdot (N_{RF} - 1)] \cdot [\sin(\theta) - \sin(\phi)]) \cdot$$
$$v_{N_{RF}}) = \left(\sum_{i=1}^{N_t^{RF}} s_i\right) \times \left(\sum_{i=1}^{N_{RF}} t_i\right) = \Sigma s \times \Sigma t$$
[Formula 17]

In FIG. 17, ϕ means a steering angle of an analog beamforming. For instance, if it is set to ϕ=30° or π/6, beam gain is maximized at θ=30° or π/6. The s shall be named a beam bound vector. And, the t is expressed as Formula 18 and shall be named a beam gain and steering vector or a beam steering vector.

The beam bound vector s indicates a pattern of an analog beam in a hybrid beamforming. The beam steering vector t indicates a gain of a hybrid beam and a pattern of a digital beam in a hybrid beamforming.

The beam bound vector s determines a range and boundary for forming a hybrid beam validly by a hybrid beamforming scheme. Hence, a range of a digital beamforming is limited within a beam bound vector as well as a range of an analog beamforming. For instance, since an analog beam cannot be validly formed over the range of the beam bound vector, it is unable to perform a hybrid beamforming over the range of the beam bound vector. Eventually, since the digital beamforming should be performed within the range of the beam bound vector, it is able to perform the hybrid beamforming.

Figure 8:
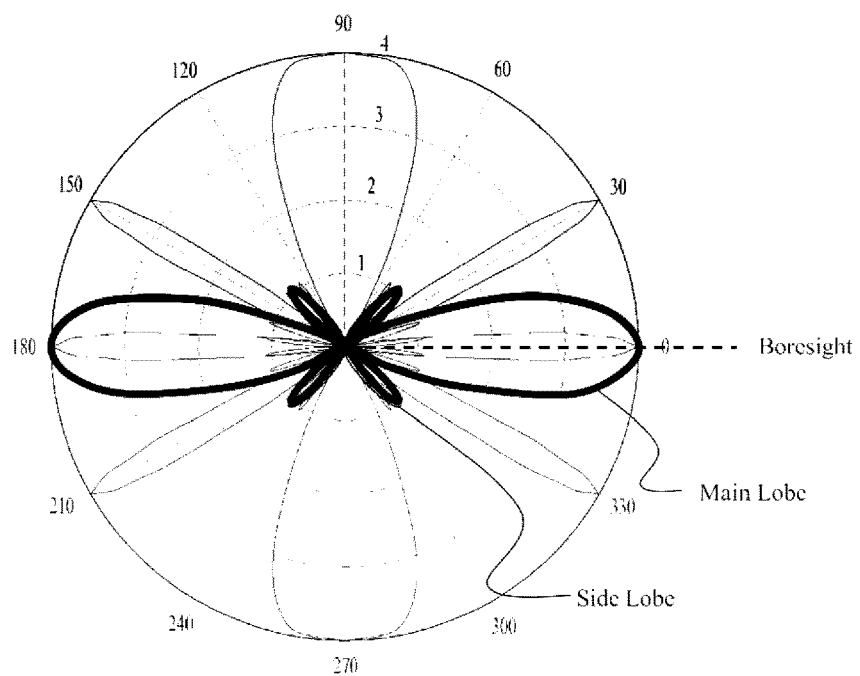
FIG. 8 is a diagram for beam patterns of a beam bound vector and a beam steering vector according to one embodiment of the present invention.

FIG. 8 shows patterns of an analog beam and a digital beam by a beam bound vector and a beam steering vector in a prescribed plane 2-dimensionally. Although an analog beam and a digital beam can be illustrated in 3D pattern, it is apparent to those skilled in the art that they are illustrated in horizontal cross-sections for clarity of the following description. In FIG. 8, $N_t$=16, $N_t^{RF}$=4, $N_{RF}$=4 are assumed. A beam pattern of a beam bund vector is denoted by a thick line, while a beam pattern of a beam steering vector is denoted by a thin line. A boresight of a main lobe of the beam bound vector is 0 degree (or 180 degrees).

A pattern of each beam has a maximum gain at a beam steering angle (i.e., a boresight of a main lobe). As the pattern deviates from the beam steering angle, a beam gain is reduced. The beam gain is represented as a distance from a circle center shown in FIG. 8. A steering angle of a beam is represented as increasing counterclockwise with reference to zero degree.

A beam steering vector can form a beam at 0 degree, 30 degrees, 90 degrees, 150 degrees, 180 degrees, 210 degrees, 270 degrees, or 330 degrees. A hybrid beamforming can be performed in an area where a beam pattern of a beam bound vector and a beam pattern of a beam steering vector cross with each other. For instance, when a steering angle is 0 (or 180), since a gain by a beam bound vector and a gain by a beam steering vector become maximum values, respectively, it is appropriate for a hybrid beamforming to be performed at a point where a steering angle is 0 degree (or 180 degrees). On the other hand, when a steering angle is 30 degrees, since a gain of a beam bound vector is 0, it is unable to perform a hybrid beamforming on the steering angle '30 degrees'.

Figure 9:
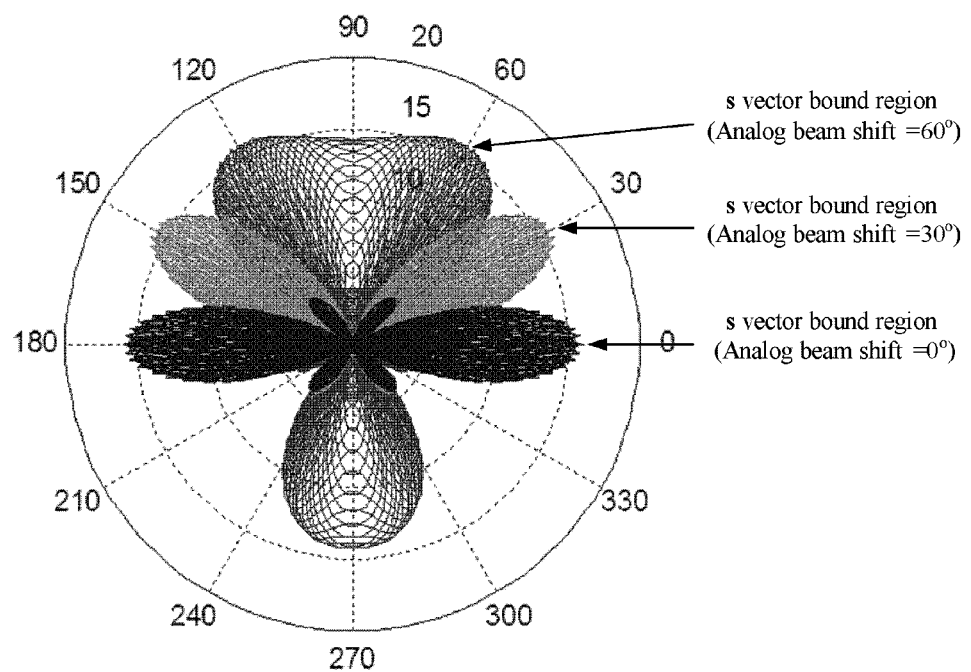
FIG. 9 is a diagram for a beam pattern of a final antenna array response vector according to an analog beam transition in accordance with one embodiment of the present invention.

FIG. 9 shows an antenna array response when a steering angle of an analog beam is shifted at 0 degree, 30 degrees, or 60 degrees. In FIG. 8, it is assumed that $N_t$=16, $N_t^{RF}$=4, $N_{RF}$=4. And, a result from applying digital $v_1$=[$v_1$ $v_2$ $v_3$ $v_4$]$^T$ is shown in FIG. 9. As mentioned in the foregoing descriptions with reference to FIG. 8 and FIG. 9, a range of a valid beam is limited by the vector s.

Digital Beamforming in Consideration of Linear Compensation of Analog Beamforming As mentioned in the foregoing description with reference to Formula 17, a hybrid beam formed by a hybrid beamforming is determined based on the total number N of $N_{RF}$ chains and the number $N_t^{RF}$ of analog antennas per RF chain. A weight vector of a digital beamforming has a length of '1×$N_{RF}$'.

A direction of a hybrid beam, i.e., a steering angle is determined as a combination of a weight of an analog beam and a weight of a digital beam. If a digital beamforming is performed without pre-compensation for an analog beamforming, an error may be generated from the steering angle of the hybrid beam.

Assuming $N_t$=16, $N_t^{RF}$=4, and $N_{RF}$=4 like Formula 16, a weight, v=[$v_1$ $v_2$ $v_3$ $v_4$]$^T$, of a digital beamforming can be represented as Formula 18.

$$v = \begin{bmatrix} v_1 \\ v_2 \\ v_3 \\ v_4 \end{bmatrix} = \begin{bmatrix} 1 \\ e^{-j\pi 4 \sin(\psi)} \\ e^{-j\pi 8 \sin(\psi)} \\ e^{-j\pi 12 \sin(\psi)} \end{bmatrix}$$
[Formula 18]

Under a more general condition, a weight of a digital beamforming can be represented as Formula 19.

$$v = \begin{bmatrix} v_1 \\ v_2 \\ \vdots \\ v_{N_{RF}} \end{bmatrix} = \begin{bmatrix} 1 \\ e^{-j\pi \cdot N_t^{RF} \cdot 1 \cdot \sin(\psi)} \\ \vdots \\ e^{-j\pi \cdot N_t^{RF} \cdot (N_{RF}-1) \cdot \sin(\psi)} \end{bmatrix}$$
[Formula 19]

A final array response vector determined in consideration of a steering angle ψ of a digital beamforming can be represented as Formula 20.

Σa(θ)=(1+exp(jπ[sin(θ)−sin(ϕ)])+exp(jπ2[sin(θ)−sin(ϕ)])+exp(jπ3[sin(θ)−sin(ϕ)]))×(1+exp(jπ4[sin(θ)−sin(ϕ)−sin(ψ)])+exp(jπ8[sin(θ)−sin(ϕ)−sin(ψ)])+exp(jπ12[sin(θ)−sin(ϕ)−sin(ψ)]))  [Formula 20]

A part [sin(θ)−sin(ϕ)−sin(ψ)] commonly entering an underlined section in Formula 20 determines an angle of a final hybrid beam. In particular, if sin(ϕ) and sin(ψ) are determined through an analog beamforming and a digital beamforming, respectively, sin(θ) for maximizing a gain of a hybrid beam is finally determined. In this case, a boresight of an analog beam is set to ϕ=30° through the analog beamforming and 'ψ=5°' is set for a fine tuning, Formula 20 can be expressed into Formula 21. For instance, in order to form a hybrid beam at 35°, assume that a beam is moved by 30° and 5° by an analog beamforming and a digital beamforming, respectively.

Σa(θ)=(1+exp(jπ[sin(θ)−sin(30°)])+exp(jπ2[sin(θ)−sin(30°)])+exp(jπ3[sin(θ)−sin(30°)]))×(1+exp(jπ4[sin(θ)−sin(30°)−sin(5°)])+exp(jπ8[sin(θ)−sin(30°)−sin(5°)])+exp(jπ12[sin(θ)−sin(30°)−sin(5°)]))  [Formula 21]

Hence, if θ satisfies sin(θ)−sin(30°)−sin(5°)=0, a gain of a hybrid beam is maximized. Yet, the θ satisfying sin(θ)− sin(30°)−sin(5°)=0 is not 35° exactly. If a steering angle of an analog beamforming and a steering angle of a digital beamforming are very small, θ≈ϕ+ψ is met approximately. Yet, if the steering angle of the analog/digital beamforming increases, θ≠ϕ+ψ is not met. Hence, an error is generated between an angle of an intended hybrid beam and an angle of an actually formed hybrid beam and a hybrid beamforming is controlled inaccurately.

Therefore, according to embodiments of the present invention, by performing a pre-compensation on an analog beamforming in performing a digital beamforming, a hybrid beamforming can be controlled accurately.

In particular, for the pre-compensation of the analog beamforming, a weight (or a steering angle) of the digital beamforming can be determined based on Formula 22.

$$v = \begin{bmatrix} v_1 \\ v_2 \\ \vdots \\ v_{N_{RF}} \end{bmatrix} = \begin{bmatrix} 1 \\ e^{j\pi \cdot N_t^{RF} \cdot 1 \cdot (\sin(\phi) - \sin(\phi+\psi))} \\ \vdots \\ e^{j\pi \cdot N_t^{RF} \cdot (N_{RF}-1)(\sin(\phi) - \sin(\phi+\psi))} \end{bmatrix} =$$

$$\begin{bmatrix} 1 \\ e^{j\pi \cdot N_t^{RF} \cdot 1 \cdot \sin(\phi)} e^{-j\pi \cdot N_t^{RF} \cdot 1 \cdot \sin(\phi+\psi)} \\ \vdots \\ e^{j\pi \cdot N_t^{RF} \cdot (N_{RF}-1) \cdot \sin(\phi)} e^{-j\pi \cdot N_t^{RF} \cdot (N_{RF}-1) \cdot \sin(\phi+\psi)} \end{bmatrix} =$$

$$\begin{bmatrix} 1 \\ e^{j\pi \cdot N_t^{RF} \cdot 1 \cdot \sin(\phi)} \\ \vdots \\ e^{j\pi \cdot N_t^{RF} \cdot (N_{RF}-1) \cdot \sin(\phi)} \end{bmatrix} \oplus \begin{bmatrix} 1 \\ e^{-j\pi \cdot N_t^{RF} \cdot 1 \cdot \sin(\phi+\psi)} \\ \vdots \\ e^{-j\pi \cdot N_t^{RF} \cdot (N_{RF}-1) \cdot \sin(\phi+\psi)} \end{bmatrix}$$

[Formula 22]

⊕: Hadamard product

In Formula 22, a left term of Hadamard product is the component for a pre-compensation of an analog beam and a right term is a finally formed digital beam component. In particular, a digital beam is finally formed at the angle of (ϕ+ψ). Moreover, in case that the digital beam is completely included in the analog beam, an area of the digital beam becomes an area of a hybrid beam in direct. Hence, it may mean that the hybrid beam is finally formed at (ϕ+ψ).

The left term is determined in accordance with a steering angle Φ of the analog beam. The right term is determined in accordance with the angle (ϕ+ψ) at which the digital beam should be finally formed.

Referring to Formula 22, coefficients for determining a weight v of a digital beamforming include a steering angle (Φ) of an analog beam, an angle (ϕ+ψ) for forming a digital beam finally, the number ($N_t^{RF}$) of antennas per RF chain, and the number ($N_{RF}$) of RF chains.

Example of setting a final steering angle of a digital beam is examined as follows. For instance, assume that it is intended to set a final steering angle of a hybrid beam to 35° in an environment of '$N_t$=16, $N_t^{RF}$=4, $N_{RF}$=4' by rotating a hybrid beam at ϕ=30° through an analog beamforming and additionally rotating it at ψ=5°. In this case, a weight of the digital beamforming determined by pre-compensation of the analog beamforming is defined as Formula 23]

$$v = \begin{bmatrix} v_1 \\ v_2 \\ v_3 \\ v_4 \end{bmatrix} = \begin{bmatrix} 1 \\ e^{j\pi \cdot 4 \cdot 1 \cdot \sin(30°)} \\ e^{j\pi \cdot 4 \cdot 2 \cdot \sin(30°)} \\ e^{j\pi \cdot 4 \cdot 3 \cdot \sin(30°)} \end{bmatrix} \oplus \begin{bmatrix} 1 \\ e^{-j\pi \cdot 4 \cdot 1 \cdot \sin(35°)} \\ e^{-j\pi \cdot 4 \cdot 2 \cdot \sin(35°)} \\ e^{-j\pi \cdot 4 \cdot 3 \cdot \sin(35°)} \end{bmatrix} =$$

$$\begin{bmatrix} 1 \\ e^{j\pi \cdot 4 \cdot \sin(30°)} \\ e^{j\pi \cdot 8 \cdot \sin(30°)} \\ e^{j\pi \cdot 12 \cdot \sin(30°)} \end{bmatrix} \oplus \begin{bmatrix} 1 \\ e^{-j\pi \cdot 4 \cdot \sin(35°)} \\ e^{-j\pi \cdot 8 \cdot \sin(35°)} \\ e^{-j\pi \cdot 12 \cdot \sin(35°)} \end{bmatrix}$$

[Formula 23]

A final antenna response vector obtained by reflecting a weight of a digital beamforming of Formula 22 in Formula 16 is expressed as Formula 24.

$$\Sigma a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times$$
$$(v_1 + \exp(j\pi 4[\sin(\theta) - \sin(\phi)]) \cdot v_2 + \exp(j\pi 8[\sin(\theta) - \sin(\phi)]) \cdot v_3 + \exp(j\pi 12[\sin(\theta) - \sin(\phi)]) \cdot v_4) =$$
$$(1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times$$
$$\begin{pmatrix} 1 + \exp(j\pi 4[\sin(\theta) - \sin(\phi) + \sin(\phi) - \sin(\phi + \psi)]) + \\ \exp(j\pi 8[\sin(\theta) - \sin(\phi) + \sin(\phi) - \sin(\phi + \psi)]) + \\ \exp(j\pi 12[\sin(\theta) - \sin(\phi) + \sin(\phi) - \sin(\phi + \psi)]) \end{pmatrix} =$$
$$(1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times (1 + \exp(j\pi 4[\sin(\theta) - \sin(\phi + \psi)]) + \exp(j\pi 8[\sin(\theta) - \sin(\phi + \psi)]) + \exp(j\pi 12[\sin(\theta) - \sin(\phi + \psi)]))$$

[Formula 24]

If a final steering angle of a hybrid beamforming is set to 35° by applying ϕ=30° and ψ=+5° to Formula 24, Formula 24 is expressed as Formula 25.

Σa(θ)=(1+exp(jπ[sin(θ)−sin(30°)])+exp(jπ2[sin(θ)−sin(30°)])+exp(jπ3[sin(θ)−sin(30°)]))×(1+exp(jπ4[sin(θ)−sin(35°)])+exp(jπ8[sin(θ)−sin(35°)])+exp(jπ12[sin(θ)−sin(35°)]))  [Formula 25]

Looking into Formula 25, when θ is 35°, a gain of a hybrid beam is maximized as intended.

Figure 10:
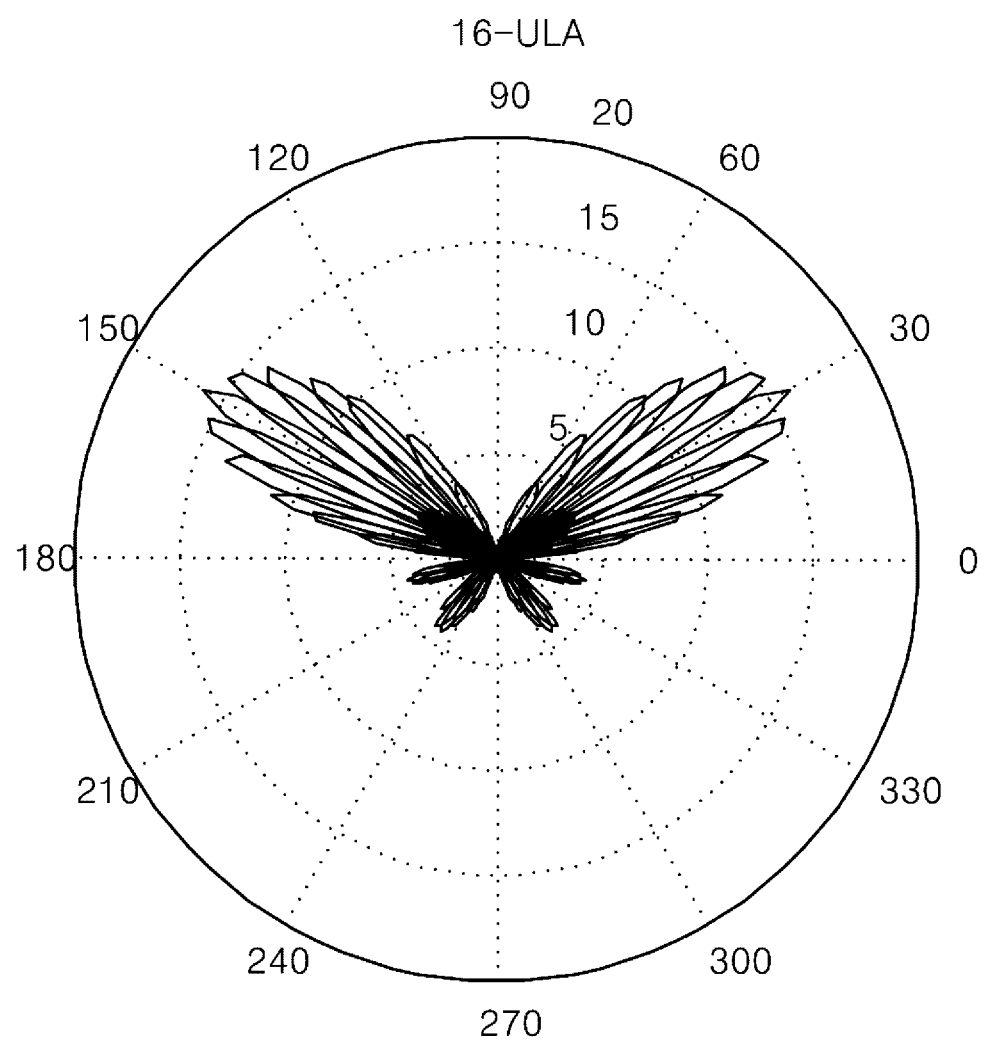
FIG. 10 is a diagram for a final antenna array response vector according to a fine-tuning digital beamforming which is performed on the basis of a fixed analog beamforming angle.

FIG. 10 shows a final antenna array response vector when a digital beamforming is performed at ψ=0, ±5°, ±10°, ±15° with reference to ϕ=30°. Referring to FIG. 10, it can be observed that a hybrid beam is accurately controlled by 5° unit through a pre-compensation of an analog beamforming.

Forming Reference Beam

Figure 11:
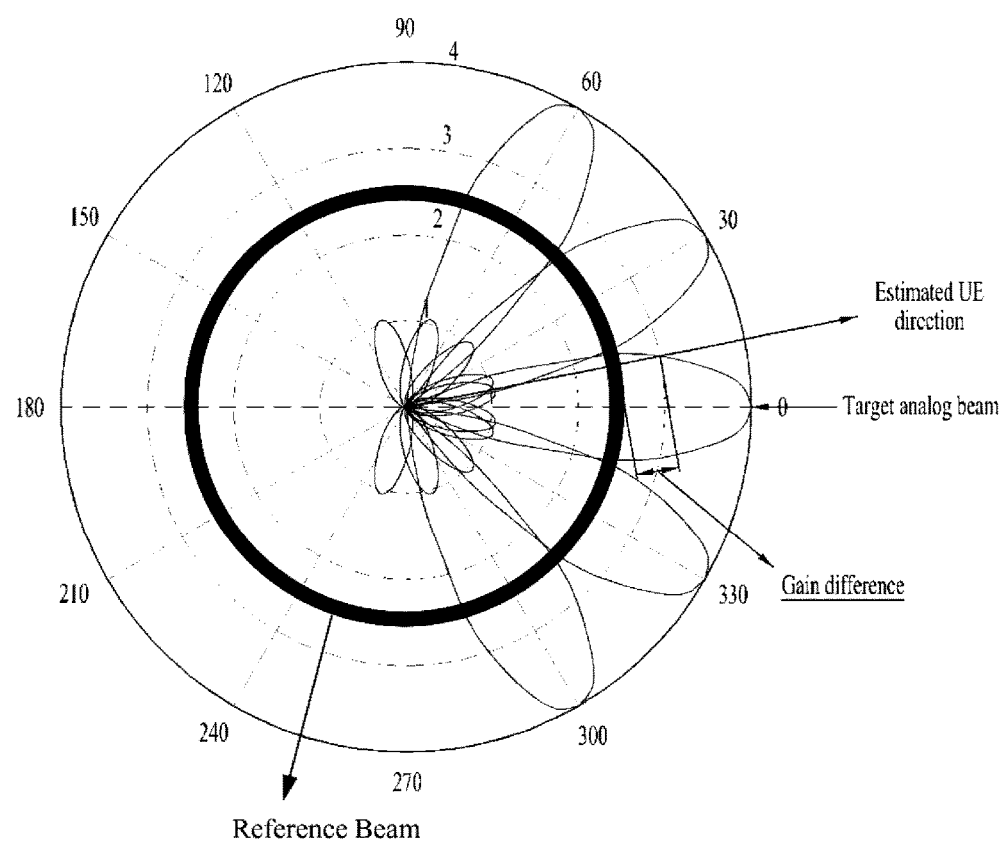
FIG. 11 is a diagram for a reference beam and a target beam according to one embodiment of the present invention.

A reference beam is proposed according to one embodiment of the present invention. As shown in FIG. 11, the reference beam can be designed to have the same beam gain for all directions. For example, a base station can form the reference beam via an omni-antenna. According to a different embodiment, the base station can form an all-direction beam of which a beam gain corresponds to 0 dB using a single antenna. According to a further different embodiment, the base station can form a directional beam using a plurality of antennas. In this case, the base station may approximately form an all-direction beam for a prescribed region.

The base station can periodically transmit a reference beam. A transmission interval of the reference beam can be set to a user equipment via RRC signaling or can be broadcasted as a part of system information. The reference beam can be generated based on a reference signal, by which the present invention may be non-limited.

If an environment causing interference, noise, and jamming from neighboring cells or a different UE is ignored, gains of a reference beam for all steering angles are the same. Gains of a reference beam are the same for all directions of which a straight distance between a base station and a UE is the same. Transmit power of a base station used in forming a reference beam can be fixed by a constant value or a cell-specific value. A gain of a reference beam may vary depending on a distance from a base station. As the distance from the base station is getting longer, the gain of the reference beam is decreasing. Hence, the gain of the reference beam can also be used as an indicator for a straight line between the base station and the UE.

Meanwhile, in FIG. 11, although a target beam is represented as an analog target beam formed by analog beamforming, by which the present invention may be non-limited. According to a different embodiment, the target beam can also be formed by digital beamforming. The target beam can be referred to as a sector beam as well.

Measuring Reference Beam

A method of estimating a final beam using a quality value difference between a reference beam and a target beam irrespective of an antenna configuration of a base station is described in the following. The embodiments described in the following are not restricted to an antenna structure for hybrid beamforming. For example, if an analog precoder shown in FIG. 7 is replaced with a digital precoder, it may be able to perform digital precoding two times in a hierarchical manner. One of two digital precoders plays a role in performing coarse beamforming (e.g., sectorization usage) and another digital precoder plays role in performing fine beamforming (e.g., UE-specific beamforming usage) in a coarse beam. The coarse beam may correspond to a target beam or a sector beam. A final narrow beam is formed at a region where the coarse beamforming and the fine beamforming are crossed.

A UE can measure a reference beam using a physical layer signal and/or a channel having a non-precoded property. In particular, a non-precoded signal among physical layer signals or channels can be used for forming and measuring a reference beam.

For example, among a plurality of physical layer signals and channels defined by 3GPP LTE/LTE-A TS 36.211, a non-precoded physical layer signal and a channel are described in the following.

Cell-specific Reference Signal (CRS)
  CSI-RS (Channel State Information Reference Signal)
  Synchronization Signal (PSS: Primary Synchronization Signal/SSS: Secondary Synchronization Signal)
  Positioning Reference Signal (PRS)
  Physical Broadcasting Channel (PBCH)
  Physical Multicast Channel (PMCH)
  Physical Control Format Indication Channel (PCFICH)
  Physical Downlink Control Channel (PDCCH)

At least one of the aforementioned signals or channels can be used for forming and measuring a reference beam, by which the present invention may be non-limited.

In order to calculate a final beam (PMI of the final beam) using measurement results of a reference beam and a target beam, it may be necessary to preferentially measure the reference beam. The measurement of the reference beam can be performed by measuring quality of the reference beam. For example, the measured quality of the reference beam may correspond to received signal power.

As mentioned in the foregoing description, a reference beam should have a practically identical or similar gain value in all directions irrespective of a direction at which a UE is located from a base station. Hence, a reference signal or a channel to which precoding or beamforming, which applies a weight in a specific direction, is not applied can be used for the reference beam. The UE can estimate a final gain of the reference beam through a non-precoded signal/channel.

Figure 12:
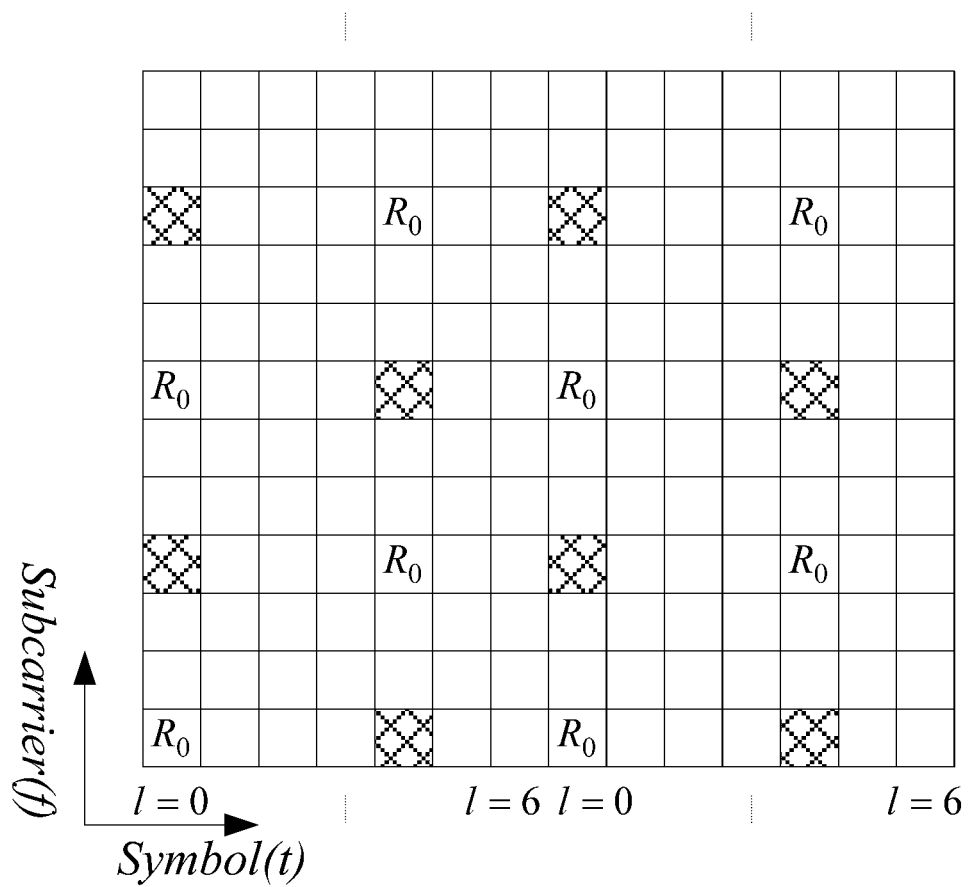
FIG. 12 is a diagram for a CRS pattern.

FIG. 12 shows a CRS pattern transmitted via an antenna port #0 of a base station. In FIG. 12, a part shadowed by a grid corresponds to a CRS pattern transmitted via a different antenna port (e.g., antenna port #1). $R_0$ corresponds to a CRS pattern transmitted via the antenna port #0.

A CRS sequence assigned to each antenna port #0 can be defined by formula 26 in the following.

$$a_{k,l}^{(p)} = r_{l,n_s}(m') \qquad \text{[Formula 26]}$$

In Formula 26, $r_{l,n_s}(m)$ corresponds to a pseudo-random sequence and $a_{k,l}^{(p)}$ corresponds to a complex modulation symbol mapped to a CRS resource.

For antenna ports #0, 1, 2, and 3, a mapping pattern between a CRS sequence and a resource is defined as Formula 27 in the following. In formula 27, p corresponds to an antenna port index and $n_s$ corresponds to a slot index in a subframe.

$$k = 6m + (v + v_{shift}) \bmod 6 \qquad \text{[Formula 27]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v_{shift} = N_{ID}^{cell} \bmod 6$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$N_{RB}^{DL}$ corresponds to the number of resource blocks on a downlink system bandwidth and $N_{symb}^{DL}$ corresponds to the number of OFDM symbols in a downlink slot. A size of the $N_{RB}^{DL}$ varies depending on a downlink transmission bandwidth configured in a cell and should satisfy $N_{RB}^{min,DL} \leq N_{RB}^{DL} \leq N_{RB}^{max,DL}$. In this case, $N_{RB}^{min,DL}$ corresponds to a minimum downlink bandwidth supported by a wireless communication system and $N_{RB}^{max,RB}$ corresponds to a maximum downlink bandwidth supported by a wireless communication system. The $N_{RB}^{min,DL}$ may corresponds to 6 and the $N_{RB}^{max,RB}$ may correspond to 110, by which the present invention may be non-limited. The number of OFDM symbols included in a slot may vary depending on a CP (cyclic prefix) length and an interval between subcarriers. In case of multi-antenna transmission, it may be able to define a resource grid per antenna port.

Each element belonging to a resource grid for each antenna port is referred to as a resource element (RE) and the RE is uniquely identified by an index pair (k,l) of a slot. In this case, k corresponds to an index in frequency domain and l corresponds to an index in time domain.

$N_{ID}^{Cell}$ corresponds to a physical cell ID of a base station and $V_{shift}$ corresponds to cell-specific frequency shifting.

When a gain of a reference beam is measured using a CRS port #0 only in a first OFDM symbol (l=0), a result can be represented as Formula 28 in the following. Since a transmitted CRS symbol $a_{k,l}^{(p)}$ is received over a radio channel, the CRS symbol received by a receiving end becomes $\hat{a}_{k,l}^{(p)}(=\hat{a}_{k,l}^{(p)} \cdot H_{k,l}^{(p)})$.

$$G_{ref}(dB) = 10\log_{10}\left(\frac{\sum_{m=0}^{2 \cdot N_{RB}^{DL}-1} |\hat{a}_{k,0}^{(0)} \cdot r_{l,n_s}^*(m')|^2}{2 \cdot N_{RB}^{DL}}\right) \quad \text{[Formula 28]}$$

Measuring Target Beam

According to one embodiment, it may be able to use a reference signal or a physical channel, which is precoded (beamforming) to have directivity in a specific direction, to measure a target beam. The target beam may correspond to a coarse beam or a sector beam. In particular, in order to measure the target beam (sector beam), it may use a precoded reference signal or physical channel.

Figure 13:
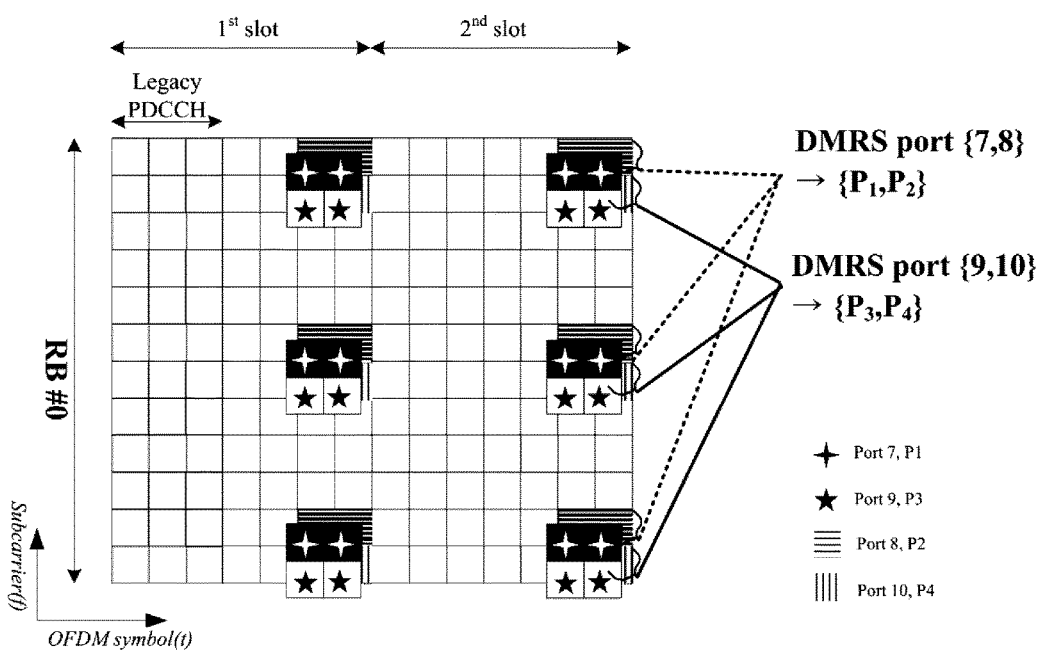
FIG. 13 is a diagram illustrating a case of using a DMRS group which is precoded to measure a target beam according to one embodiment of the present invention.

A base station can transmit a group index of a precoded reference signal to a UE to measure a target beam. For example, as shown in Table 2, the base station configures 4 Demodulation Reference Signal (DMRS) ports or 4 precoded CSI-RS ports as a group to measure 4 target beams in total and transmits information on the group to the UE. The UE obtains quality of the target beams using the DMRSs or the CSI-RSs configured as a group. For example, if the number of target beams corresponds to 4, as shown in FIG. 13, it may be able to assign a digital PMI corresponding to an analog target beam to DMRS ports #7, 8, 9, and 10, respectively. In particular, according to the present embodiment, a different PMI is assigned to each DMRS port (or each CSI-RS port). For example, a first antenna port transmits a DMRS (or CSI-RS) in a first direction (beamforming in first direction) and a second antenna port transmits a DMRS (or CSI-RS) in a second direction (beamforming in second direction). In particular, it may be able to differently configure a PMI and a beamforming direction according to an antenna port. Beamforming performed by each of antenna ports can be performed at the same time in a different direction.

TABLE 2

| Target beam ID | PMI (target beam Precoding Index) | DMRS port | CSI-RS port |
|---|---|---|---|
| $P_{Sector\_1}$ | $P_1$ | Port 7 | Port 15 |
| $P_{Sector\_2}$ | $P_2$ | Port 8 | Port 16 |
| $P_{Sector\_3}$ | $P_3$ | Port 9 | Port 17 |
| $P_{Sector\_4}$ | $P_4$ | Port 10 | Port 18 |

In the aforementioned examples, (i) a DMRS group or (ii) a precoded CSI-RS group is used as a precoded RS, by which the present invention may be non-limited. According to a different embodiment, it may be able to define and use (ii) a precoded physical channel (e.g., EPDCCH) or (iv) an RS of a new type.

Figure 14:
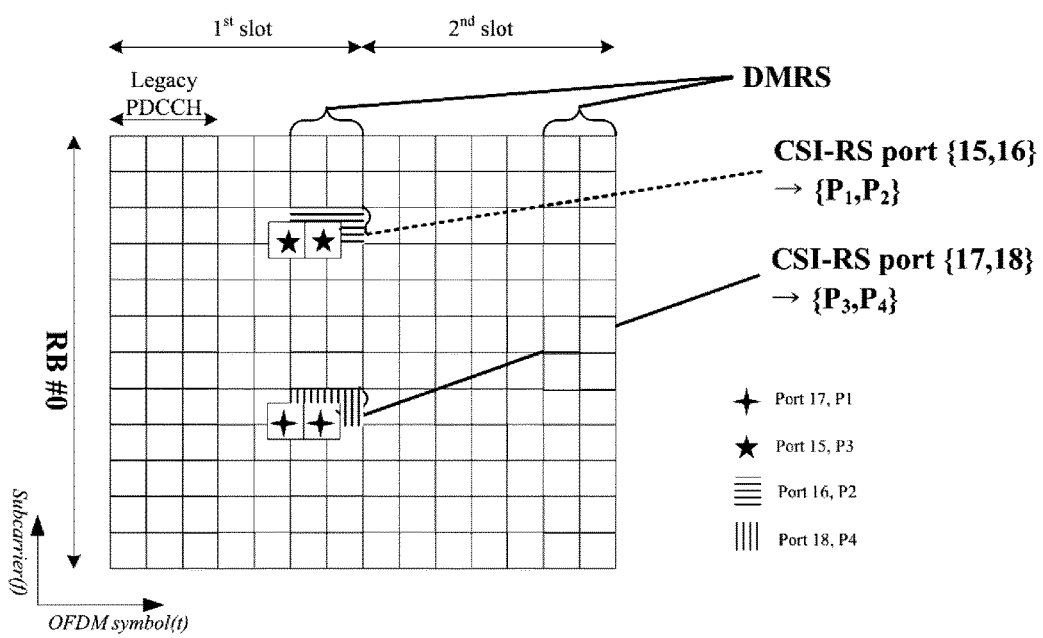
FIG. 14 is a diagram illustrating a case of using a CSI-RS group which is precoded to measure a target beam according to one embodiment of the present invention.

FIG. 14 is a diagram illustrating a case of using a CSI-RS group, which is precoded to measure a target beam. A base station individually informs each UE of a CSI-RS configuration to allocate a precoded CSI-RS group to UEs and transmits a precoded CSI-RS to each UE to transmit a target beam. A UE measures a target beam through the received CSI-RS. As shown in Table 2, the base station can assign a digital PMI corresponding to an analog target beam to CSI-RS ports #15, 16, 17, and 18, respectively.

Feedback of UE

According to one embodiment of the present invention, it may be able to estimate a direction at which a UE is located from a base station based on a gain difference between a reference beam measured by the UE and a target beam measured by the UE.

For example, referring to FIG. 11, the base station forms target beams of 0°, ±30°, and ±60°. The target beams 0°, ±30°, and ±60° can be formed via a precoded RS or channel. As mentioned in the foregoing description, a different antenna port can be used for each direction. For example, a first antenna port can transmit an RS precoded in 0° direction and a second antenna port can transmit an RS precoded in 30° direction.

A UE is located on an estimated UE direction straight line. A gain ($G_{ref}$) of a reference beam may appear at a point where a straight line indicating a direction at which the UE is located and a circle corresponding to the reference beam are crossed. Similarly, a gain ($G_{mea}$) of a target beam may appear at a point where a straight line indicating a direction at which the UE is located and the target beam (0°) are crossed. Meanwhile, since it is difficult for the UE to measure target beams formed on other steering angles (e.g., 30°, 60°, etc.), a beam gain does not appear.

A difference between the gain ($G_{ref}$) of the reference beam and the gain ($G_{mea}$) of the target beam can be defined as Formula 29 in the following.

$$G_{diff} = G_{mea} - G_{ref}(dB) \quad \text{[Formula 29]}$$

According to one embodiment of the present invention, a UE transmits feedback information to a base station based on a difference (Gdiff) between a gain (Gref) of a reference beam and a gain (Gmea) of a target beam.

Meanwhile, the feedback information can include an index of an antenna port from which the target beam is transmitted. For example, when the UE measures a target beam via a precoded DMRS or a CSI-RS, which is transmitted from a first antenna port of the base station in 0° direction, the UE can transmits an index of the first antenna port as the feedback information.

In particular, the feedback information can include index information on an antenna port, which is used for transmitting a gain difference between a reference beam and a target beam and the target beam. The base station can identify a direction in which the target beam is formed based on the index information on the antenna port received from the UE.

Determining Final PMI

The base station can determine PMI for beamforming using the information on the antenna port index and the beam gain difference previously fed back by the UE. According to one embodiment of the present invention, the base station can determine PMI of final narrow beamforming through a predefined lookup table (or a codebook). Table 3 shows a lookup table according to one embodiment.

For example, when the base station performs hybrid beamforming, the base station sets a target beam PMI ($P_t$) to an analog beamformer using the antenna port index fed back by the UE and deducts and configures a final digital beamformer PMI ($F_i$) using the information on the gain difference.

TABLE 3

| Antenna port index (Feedback from UE) | Target beam information (beam ID) (BS configuration) | Gain difference (dB) (Feedback from UE) | Final digital PMI (BS configuration) |
|---|---|---|---|
| 1 | Beam #1 (Boresight = 0°) → $P_1$ | $G_1$ $G_2$ . . . $G_L$ | $F_1$ $F_2$ . . . $F_L$ |
| 2 | Beam #2 (Boresight = 30°) → $P_2$ | $G_1$ $G_2$ . . . $G_L$ | $F_{L+1}$ $F_{L+2}$ . . . $F_{2L}$ |
| . . . | . . . | . . . | . . . |

Meanwhile, it is not mandatory that a range to which the aforementioned embodiments are applied is restricted to hybrid beamforming. For example, the embodiments can also be applied to a form that an analog beamforming end is replaced with a digital beamforming end. Digital beamforming can be sequentially and serially performed according to each antenna sub group via antenna subgrouping. In particular, the present embodiments can also be applied to a digital beamforming scheme having a hierarchical structure.

So far, for clarity, the embodiments of the present invention are described on the basis of downlink, by which the present invention may be non-limited. The embodiments can be applied to various types of combinations between a transmitter and a receiver. For example, the embodiments can be applied to an uplink transmission scenario that a UE transmits a signal to a base station, a signal transmission (D2D, V2V, etc.) scenario between UEs, or a signal transmission (relay, wireless backhaul, etc.) scenario between base stations.

Figure 15:
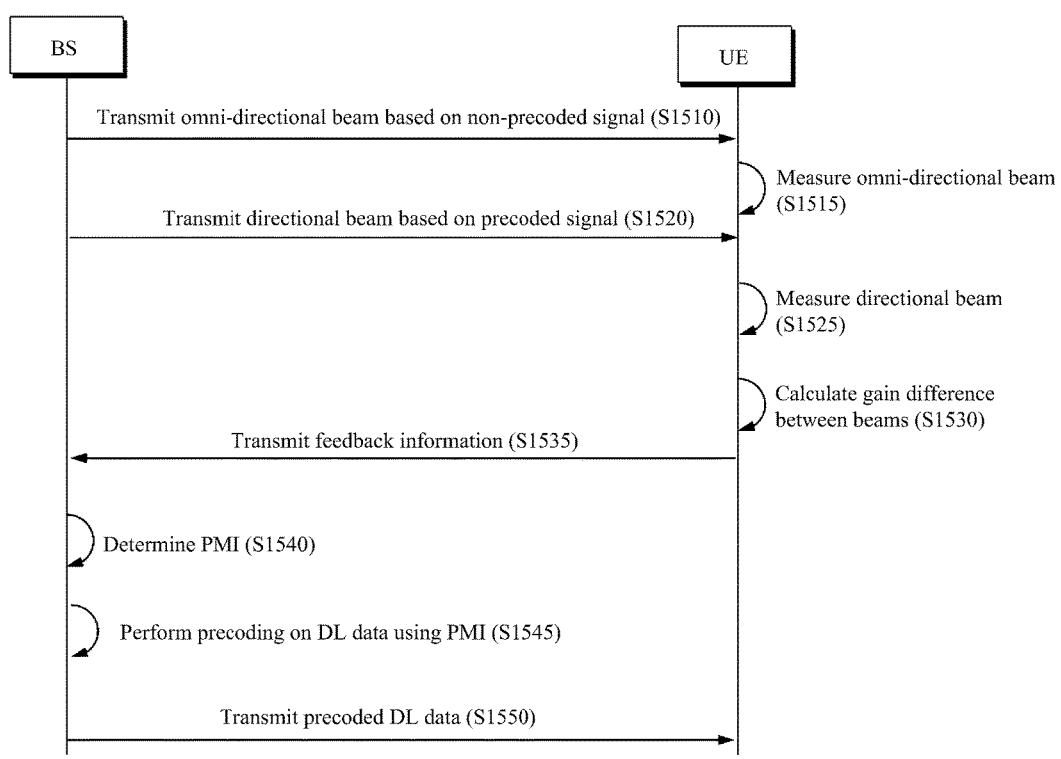
FIG. 15 is a flowchart for a method of transmitting and receiving feedback information according to one embodiment of the present invention.

FIG. 15 is a flowchart for a method of transmitting and receiving feedback information according to one embodiment of the present invention. Explanation on contents overlapped with the aforementioned content is omitted.

A base station transmits an omni-directional beam, which is uniformly formed in all directions, to a UE based on a non-precoded signal [S1510]. The omni-directional beam may correspond to the aforementioned reference beam. The non-precoded signal may correspond to one selected from the group consisting of a Cell-specific Reference Signal (CRS), a Primary Synchronization Signal (PSS), an Secondary Synchronization Signal (SSS), a Positioning Reference Signal (PRS), a Physical Broadcasting Channel (PBCH), a Physical Multicast Channel (PMCH), a Physical Control Format Indication Channel (PCFICH), and a Physical Downlink Control Channel (PDCCH).

The UE measures the omni-directional beam [S1515].

The base station transmits a plurality of directional beams based on signals which are precoded in a different direction according to each of a plurality of antenna ports [S1520]. A directional beam may correspond to the aforementioned target beam. The precoded signals may correspond to one selected from the group consisting of a Demodulation Reference Signal (DMRS), a CSI-RS (Channel State Information-Reference Signal), and ePDCCH (enhanced PDCCH).

The UE measures the directional beam [S1525]. Assume that the UE is able to measure a first directional beam among the plurality of directional beams.

The UE calculates a gain difference between the omni-directional beam and the directional beam [S1530]. The gain difference between the first directional beam and the omni-directional beam indicates a direction at which the UE is positioned in the first directional beam.

The UE transmits feedback information to the base station [S1535]. The feedback information can include the gain difference between the first directional beam and the omni-directional beam and an index of a first antenna port used in transmitting the first directional beam among the plurality of antenna ports.

The base station determines PMI based on the feedback information [S1540]. The base station can identify a direction of the first directional beam based on the index of the first antenna port. The base station selects PMI which is mapped to the direction of the first directional beam and the gain difference identified from a codebook.

The base station performs precoding on downlink data [S1545] and transmits the precoded downlink data to the UE [S1550]. For example, the base station performs precoding on the downlink data via the determined PMI.

Figure 16:
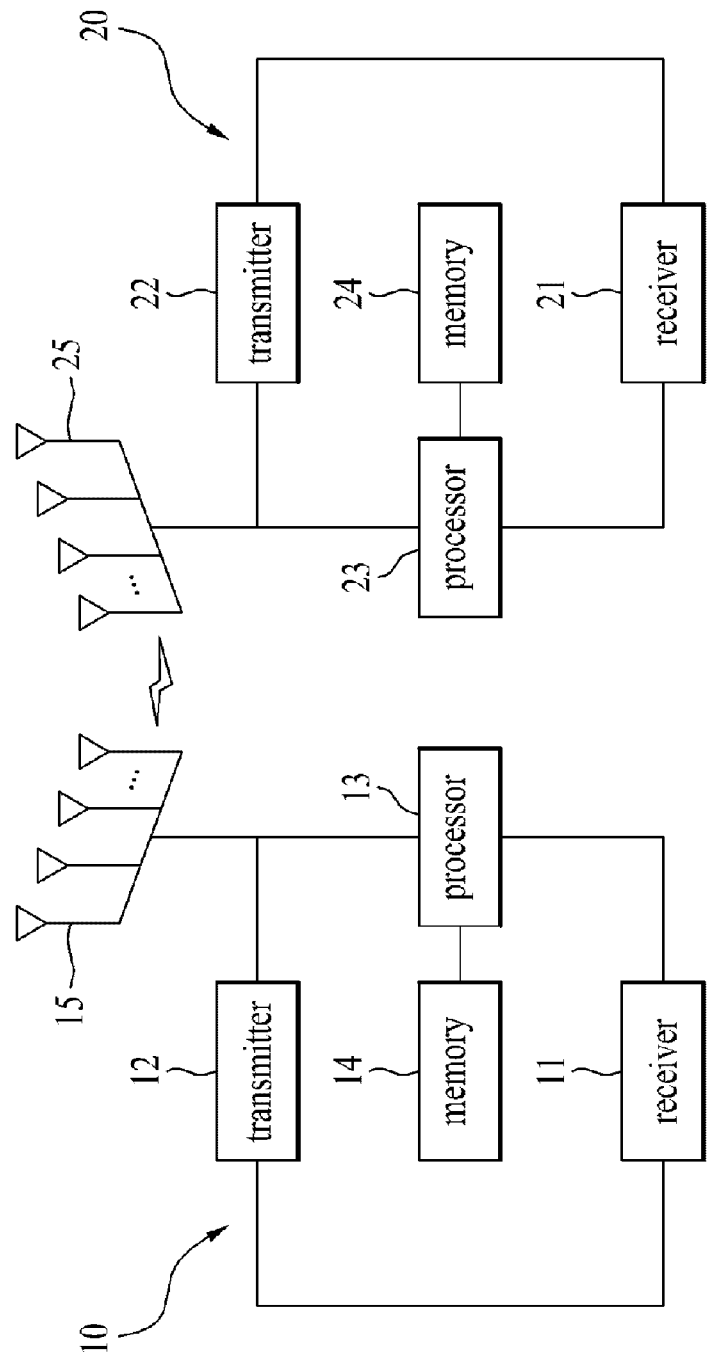
FIG. 16 is a diagram for a base station and a user equipment according to one embodiment of the present invention.

FIG. 16 is a diagram for a base station and a user equipment according to one embodiment of the present invention. A base station (BS) 10 and a user equipment (UE) 20 shown in FIG. 16 can perform the aforementioned methods. Explanation on contents overlapped with the aforementioned content is omitted.

A base station (BS) 10 can include a receiver 11, a transmitter 12, a processor 13, a memory 14 and a plurality of antennas 15. A plurality of the antennas 15 correspond to a base station supporting MIMO transmission and reception. The receiver 11 can receive various signals, data and information from the user equipment in UL. The transmitter 12 can transmit various signals, data and information to the user equipment in DL. The processor 13 can control overall operation of the base station 10.

Besides, the processor 13 of the base station 10 performs a function of calculating and processing information received by the base station 10, information to be transmitted to the external and the like. The memory 14 can store processed information for prescribed time and can be replaced with such a configuration element as a buffer (not depicted).

According to one embodiment of the present invention, the transmitter of the base station transmits an omni-directional beam which is uniformly formed for all directions based on a non-precoded first signal and transmits a plurality of directional beams based on second signals which are precoded in a different direction according to each of a plurality of antenna ports. The receiver receives feedback information from the user equipment. The feedback information can include a gain difference between a first directional beam among the plurality of directional beams and the omni-directional beam and an index of a first antenna port which is used for transmitting the first directional beam among the plurality of antenna ports.

A user equipment (UE) 20 can include a receiver 21, a transmitter 22, a processor 23, a memory 24 and a plurality of antennas 25. A plurality of the antennas 25 correspond to a UE supporting MIMO transmission and reception. The receiver 21 can receive various signals, data and information from the base station in DL. The transmitter 22 can transmit various signals, data and information to the base station in UL. The processor 23 can control overall operation of the UE 20.

Besides, the processor 23 of the UE 20 performs a function of calculating and processing information received by the UE 20, information to be transmitted to the external and the like. The memory 24 can store processed information for prescribed time and can be replaced with such a configuration element as a buffer (not depicted).

According to one embodiment of the present invention, the processor of the UE measures an omni-directional beam which is uniformly formed for all directions based on a non-precoded first signal and measures a first directional beam among a plurality of directional beams based on second signals which are precoded in a different direction according to each of a plurality of antenna ports of the base station. The transmitter transmits feedback information to the base station according to the control of the processor. The feedback information can include a gain difference between the first directional beam among the plurality of directional beams and the omni-directional beam and an index of a first antenna port which is used for transmitting the first directional beam among the plurality of antenna ports.

Embodiments of the present invention can be implemented using various means. For instance, embodiments of the present invention can be implemented using hardware, firmware, software and/or any combinations thereof.

In case of the implementation by hardware, a method according to each of the embodiments of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, embodiments of the present invention are applicable to various kinds of mobile communication systems.

What is claimed is:

1. A method of receiving feedback information for hybrid beamforming by a base station in a wireless communication system, the method comprising:
   transmitting an omni-directional beam, which is uniformly formed in all directions, based on a non-precoded first signal;
   transmitting a plurality of directional beams through a plurality of antenna ports based on second signals which are precoded in different directions;
   receiving, from a user equipment (UE), feedback information including a gain difference between a specific directional beam among the plurality of directional beams and the omni-directional beam and an index of an antenna port used for transmitting the specific directional beam among the plurality of antenna ports;
   setting an analog beamformer by identifying a direction of the specific directional beam based on the index of the antenna port;
   determining a precoding matrix index (PMI) of a digital beamformer from a subset of a codebook, wherein the subset of the codebook corresponds to PMIs available for the identified direction, each of the PMIs in the subset is associated with each of a plurality of gain difference values, and the determined PMI is associated with the gain difference of the feedback information; and
   performing hybrid beamforming using the analog beamformer and the digital beamformer.

2. The method of claim 1, wherein transmitting the plurality of directional beams comprises:
   transmitting each of the plurality of directional beams in a different direction via each of the plurality of antenna ports.

3. The method of claim 1, wherein the plurality of directional beams are formed by precoding at least one of a Demodulation Reference Signal (DMRS), a Channel State Information-Reference Signal (CSI-RS), and an enhanced Physical Downlink Control Channel (EPDCCH) in a different direction.

4. The method of claim 1, wherein the omni-directional beam is formed based on at least one of a Cell-specific Reference Signal (CRS), a Primary Synchronization Signal (PSS), an Secondary Synchronization Signal (SSS), a Positioning Reference Signal (PRS), a Physical Broadcasting Channel (PBCH), a Physical Multicast Channel (PMCH), a Physical Control Format Indication Channel (PCFICH), and a Physical Downlink Control Channel (PDCCH).

5. The method of claim 1, wherein the gain difference between the first directional beam and the omni-directional beam indicates a direction at which the UE is located within the specific directional beam.

6. A base station for receiving feedback information for beamforming in a wireless communication system, the base station comprising:

a transmitter configured to transmit an omni-directional beam, which is uniformly formed in all directions, based on a non-precoded first signal, and to transmit a plurality of directional beams through a plurality of antenna ports based on second signals which are precoded in different directions;

a receiver configured to receive, from a user equipment (UE), feedback information including a gain difference between a specific directional beam among the plurality of directional beams and the omni-directional beam and an index of an antenna port used for transmitting the specific directional beam among the plurality of antenna ports; and a processor configured to control the transmitter and the receiver, to set an analog beamformer by identifying a direction of the specific directional beam based on the index of the antenna port, to determine a precoding matrix index (PMI) of a digital beamformer from a subset of a codebook, and to perform hybrid beamforming using the analog beamformer and the digital beamformer, wherein the subset of the codebook corresponds to PMIs available for the identified direction, each of the PMIs in the subset is associated with each of a plurality of gain difference values, and the determined PMI is associated with the gain difference of the feedback information.

7. The base station of claim 6, wherein the processor controls the transmitter to transmit each of the plurality of directional beams in a different direction via each of the plurality of antenna ports.

8. The base station of claim 6, wherein the plurality of directional beams are formed by precoding at least one of a Demodulation Reference Signal (DMRS), a Channel State Information-Reference Signal (CSI-RS), and an enhanced Physical Downlink Control Channel (EPDCCH) in a different direction.

9. The base station of claim 6, wherein the omni-directional beam is formed based on at least one of a Cell-specific Reference Signal (CRS), a Primary Synchronization Signal (PSS), an Secondary Synchronization Signal (SSS), a Positioning Reference Signal (PRS), a Physical Broadcasting Channel (PBCH), a Physical Multicast Channel (PMCH), a Physical Control Format Indication Channel (PCFICH), and a Physical Downlink Control Channel (PDCCH).

10. The base station of claim 6 wherein the gain difference between the first directional beam and the omni-directional beam indicates a direction at which the UE is located within the specific directional beam.

* * * * *